(12) United States Patent
Gysling

(10) Patent No.: US 7,975,559 B2
(45) Date of Patent: *Jul. 12, 2011

(54) APPARATUS FOR ATTENUATING ULTRASONIC WAVES PROPAGATING WITHIN A PIPE WALL

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/497,075

(22) Filed: Jul. 2, 2009

(65) Prior Publication Data

US 2010/0000331 A1    Jan. 7, 2010

Related U.S. Application Data

(60) Provisional application No. 61/078,091, filed on Jul. 3, 2008, provisional application No. 61/098,022, filed on Sep. 18, 2008, provisional application No. 61/115,785, filed on Nov. 18, 2008.

(51) Int. Cl.
*G01F 1/66* (2006.01)
(52) U.S. Cl. .................................................. 73/861.28
(58) Field of Classification Search ... 73/861.27–861.29
See application file for complete search history.

(56) References Cited

U.S. PATENT DOCUMENTS

| | | | |
|---|---|---|---|
| 4,388,127 A | 6/1983 | Brunner et al. |
| 4,556,813 A | 12/1985 | Baumoel |
| 4,598,583 A | 7/1986 | Steinhauser |
| 4,735,097 A | 4/1988 | Lynnworth |
| 4,852,068 A | 7/1989 | Track |
| 5,131,279 A | 7/1992 | Lang et al. |
| 5,594,180 A | 1/1997 | Carpenter et al. |
| 6,443,226 B1 | 9/2002 | Diener et al. |
| 6,481,288 B1 | 11/2002 | Humphrey et al. |
| 6,526,838 B1 | 3/2003 | Froelich et al. |
| 6,550,342 B2 | 4/2003 | Croteau et al. |
| 6,550,345 B1 | 4/2003 | Letton |
| 6,575,043 B1 | 6/2003 | Huang et al. |
| 6,626,049 B1 | 9/2003 | Ao |
| 6,634,239 B2 | 10/2003 | Gomm et al. |
| 6,868,737 B2 | 3/2005 | Croteau et al. |
| 6,889,562 B2 | 5/2005 | Gysling et al. |
| 6,988,411 B2 | 1/2006 | Gysling et al. |

(Continued)

FOREIGN PATENT DOCUMENTS

DE    4306119    9/1994

(Continued)

*Primary Examiner* — Jewel Thompson
(74) *Attorney, Agent, or Firm* — O'Shea Getz P.C.

(57) ABSTRACT

A damping device for a fluid flow meter is provided. The fluid flow meter is mountable on the exterior of a pipe to meter fluid flow traveling within the pipe. The flow meter has at least one ultrasonic sensor operable to transmit ultrasonic signals through a wall in a direction substantially normal to the pipe wall and into a fluid flow disposed within the pipe. The transmitted signals create secondary ultrasonic signals circumferentially traveling within the pipe wall at one or more frequencies. The damping device includes a tuned body attachable to the pipe wall at one or more contact points. The body has one or more resonant structural modes, each with a natural frequency, which natural frequencies are closely matched to the one or more frequencies of the secondary signals. The body is operable to dissipate energy upon excitation by the secondary signals.

23 Claims, 7 Drawing Sheets

U.S. PATENT DOCUMENTS

| | | |
|---|---|---|
| 7,096,719 B2 | 8/2006 | Gysling |
| 7,322,251 B2 | 1/2008 | Gysling et al. |
| 7,331,233 B2 | 2/2008 | Scott |
| 7,389,187 B2 | 6/2008 | Kersey et al. |
| 7,430,924 B2 | 10/2008 | Gysling et al. |
| 7,437,946 B2 | 10/2008 | Gysling |
| 7,526,966 B2 | 5/2009 | Gysling et al. |
| 2008/0098818 A1 | 5/2008 | Fernald et al. |
| 2008/0098824 A1 | 5/2008 | Bailey et al. |
| 2008/0173100 A1 | 7/2008 | Davis |
| 2009/0025487 A1 | 1/2009 | Gysling et al. |
| 2009/0158858 A1 | 6/2009 | Gysling et al. |
| 2009/0229364 A1 | 9/2009 | Gysling |
| 2010/0257941 A1* | 10/2010 | Gysling ................ 73/861.28 |

FOREIGN PATENT DOCUMENTS

| | | |
|---|---|---|
| GB | 2210169 | 6/1989 |
| WO | 93/014382 | 7/1993 |

* cited by examiner

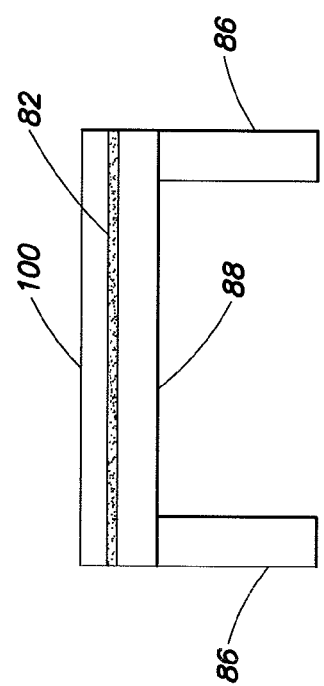
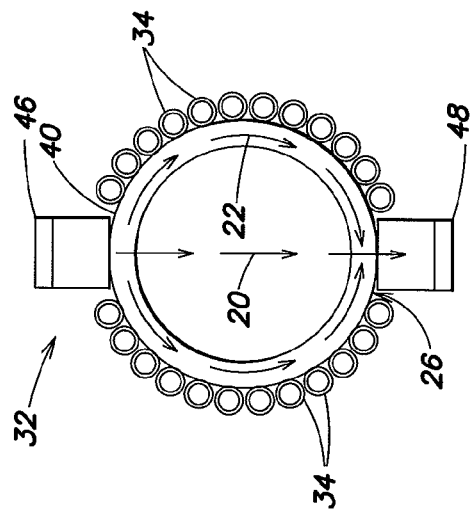
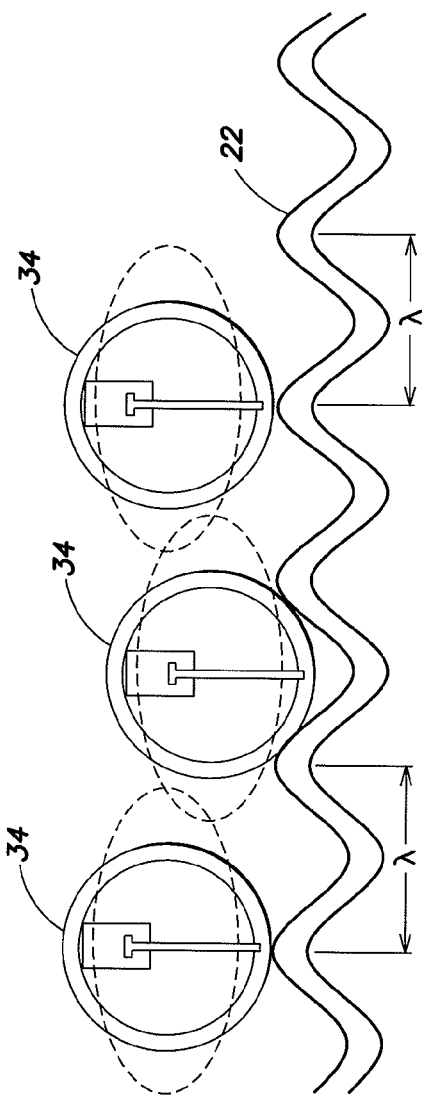

APPARATUS FOR ATTENUATING ULTRASONIC WAVES PROPAGATING WITHIN A PIPE WALL

This application claims the benefit of U.S. Provisional Patent Application Ser. Nos. 61/078,091, filed Jul. 3, 2008, 61/098,022 filed Sep. 18, 2008, and 61/115,785 filed Nov. 18, 2008, all of which are hereby incorporated in their entirety.

BACKGROUND OF THE INVENTION

1. Technical Field

This invention relates to a method and apparatus for attenuating acoustic waves (often termed "ring around" acoustics) propagating through the walls of a pipe for a clamp-on ultrasonic flow meter.

2. Background Information

Clamp-on ultrasonic flow meters are a desirable tool for determining characteristics of a fluid flow traveling through a pipe. The flow meters, such as that shown in FIG. 1A, typically include a plurality of ultrasonic sensors, each having a transmitter (TX) and a receiver (RX). In some sensor configurations, ultrasonic signals emitted from a transmitter travel through the immediate pipe wall, the fluid flow disposed within the pipe, and through the opposite pipe wall where they are sensed by a receiver. In other sensor configurations, transmitters and receivers are disposed on the same side of the pipe; the sensed fluid flow signal component is one that has reflected off of the opposite pipe wall and traversed the fluid flow a second time. Regardless of the sensor configuration, the received signal is processed to determine information such as flow velocity, volumetric flow rate, water cut, etc.

One of the primary challenges associated with clamp-on ultrasonic flow metering is distinguishing the fluid borne signal component from a structural borne component that is generated when the ultrasonic signal travels through the pipe on a path substantially normal to the surface of the pipe. FIG. 1A diagrammatically illustrates a clamp-on flow metering arrangement having a transmitter (TX) and a receiver (RX) operable to transmit and receive signals that include a fluid borne signal component 20 and a structural borne component 22. The fluid borne component 20 contains useful information relating to characteristics of the fluid flow 24. The structural signal component 22, on the other hand, does not travel through the fluid flow 24, and therefore does not contain useful information relative to the fluid flow 24. In fact, the structural borne signal 22 is predominantly a shear wave that travels within the pipe wall 26, and can "ring-around" the pipe circumference several times before dissipating. Collectively, the structural borne "ring-around" signals 22 create interference that makes it difficult to extract the desired fluid borne signal component 20. Hence, there is considerable value in minimizing or eliminating structural borne signal components 22.

SUMMARY OF THE INVENTION

According to one aspect of the present invention, a damping device for a fluid flow meter is provided. The fluid flow meter is mountable on the exterior of a pipe to meter fluid flow traveling within the pipe. The flow meter has at least one ultrasonic sensor operable to transmit ultrasonic signals through a wall in a direction substantially normal to the pipe wall and into a fluid flow disposed within the pipe. The transmitted signals create secondary ultrasonic signals circumferentially traveling within the pipe wall at one or more frequencies. The damping device includes one or more tuned bodies attachable to the pipe wall at one or more contact points. Each body has one or more resonant structural modes, each mode with an associated natural frequency, which natural frequencies are closely matched to the one or more frequencies of the secondary signals. The body is operable to dissipate energy upon excitation by the secondary signals.

According to another aspect of the present invention, a fluid flow meter apparatus is provided, which apparatus can be attached to a pipe and is operable to meter fluid flow traveling within the pipe. The apparatus includes a metering device and a plurality of tuned damping devices. The metering device has a plurality of ultrasonic sensors, each having a transmitter and a receiver. The sensors are operable to be mounted on an exterior surface of a wall of the pipe and to transmit ultrasonic signals orthogonally through the wall and into the fluid flow traveling within the pipe. The transmitted signals create secondary ultrasonic signals circumferentially traveling within the pipe wall at a frequency. The tuned damping devices are attachable to the exterior of the pipe wall. Each tuned damping device has one or more contact points for contacting the pipe wall, and each device has one or more resonant structural modes, each mode with an associated natural frequency, which natural frequencies are closely matched to the one or more frequencies of the secondary signals. Each device is operable to dissipate energy upon excitation by the secondary signals.

According to another aspect of the present invention, a method of damping signals circumferentially traveling within a pipe wall is provided. The method includes the steps of: 1) attaching a metering device having a plurality of ultrasonic sensors to the pipe, each having a transmitter and a receiver, which sensors are operable to transmit predetermined ultrasonic signals at one or more primary frequencies, which predetermined signals create secondary ultrasonic signals circumferentially traveling within a wall of the pipe at one or more secondary frequencies; 2) attaching a plurality of damping devices to the pipe wall, wherein each damping device has a body that has one or more resonant structural modes, each with an associated natural frequency, which natural frequencies are closely matched to one or more of the secondary frequencies; 3) transmitting one or more of the primary frequencies through the pipe wall in a direction that is substantially normal to the pipe wall; and 4) damping secondary signals using the damping devices attached to the wall.

According to another aspect of the present invention, a damping device for a fluid flow meter is provided. The flow meter is mountable on the exterior of a pipe to meter fluid flow traveling within the pipe. The flow meter has at least one ultrasonic sensor operable to transmit ultrasonic signals through a pipe wall in a direction normal to the pipe wall and into a fluid flow disposed within the pipe. The transmitted signals create secondary ultrasonic signals circumferentially traveling within the pipe wall at a frequency. The device includes a platform and a plurality of tines. The platform is conformable to an exterior surface of the pipe wall, and has a sensor-side surface and a tine-side surface. The plurality of tines is attached to the platform and extends outwardly from the tine-side surface. Each tine has a distal end, and the distal ends are shaped to mate with the exterior of the pipe. Each tine is spaced apart from an adjacent tine by a tine-to-tine distance.

According to another aspect of the present invention, a fluid flow meter apparatus is provided. The apparatus is operable to be attached to a pipe and to meter fluid flow traveling within the pipe. The apparatus includes a metering device and at least one shoe. The metering device has a plurality of ultrasonic sensors, each having a transmitter and a receiver. The sensors are operable to be mounted on an exterior surface of a wall of the pipe and to transmit ultrasonic signals orthogonally through the wall and into the fluid flow traveling within the pipe. The signals create secondary ultrasonic signals circumferentially traveling within the pipe wall at a frequency. The shoe is disposed between at least one of the receivers and the pipe wall, or the transmitters and the pipe wall. The shoe includes a plurality of tines extending substantially parallel to one another, and each tine spaced apart from an adjacent tine by a tine-to-tine distance.

The present apparatus and advantages associated therewith will become more readily apparent in view of the detailed description provided below, including the accompanying drawings.

BRIEF DESCRIPTION OF THE DRAWINGS

FIG. 9 is a diagrammatic view of the damping device embodiment shown in FIG. 7, including an elastomeric layer disposed between panels.

FIG. 10 is a diagrammatic view of an embodiment of a present invention damping device.

FIG. 11 is a diagrammatic view of the damping device shown in FIG. 10, subject to a circumferentially traveling ring-around signal wave.

DETAILED DESCRIPTION OF THE INVENTION

Figure 1A:
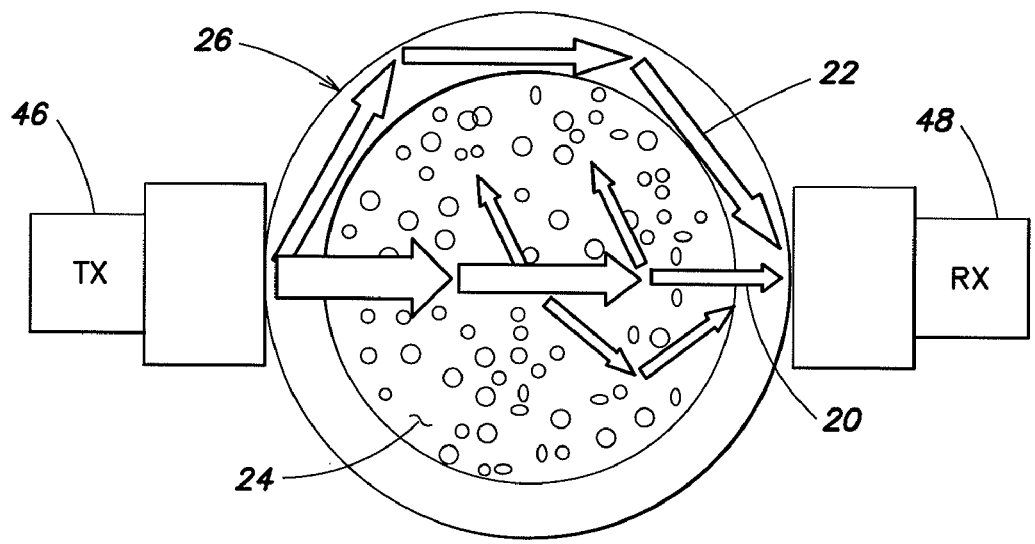
FIG. 1A is a diagrammatic view of a fluid flow meter system including a fluid flow metering device mounted on a pipe, illustrating signal components including a fluid borne component and a structural borne component.
Figure 1B:
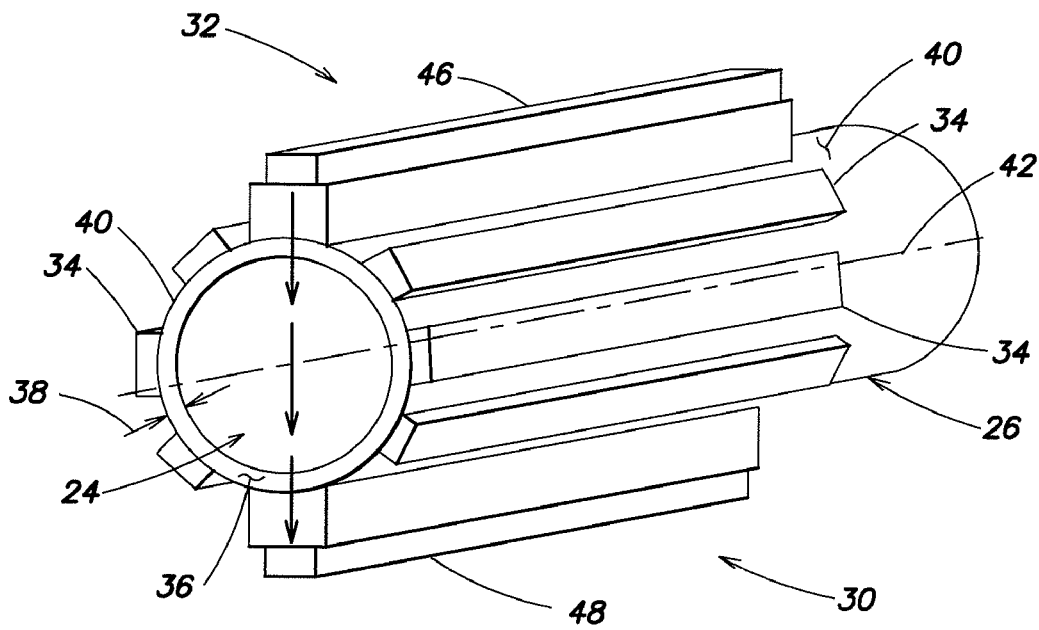
FIG. 1B is a diagrammatic isometric view of a fluid flow metering system mounted on a pipe, including a fluid flow meter and a plurality of damping devices.
Figure 2:
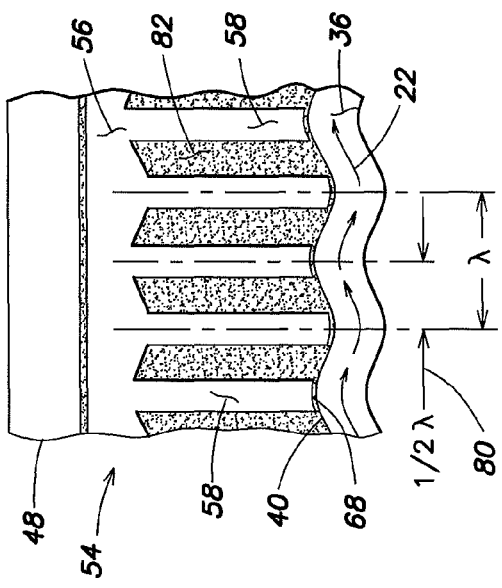
FIG. 2 is a diagrammatic view of a fluid flow meter system, including a fluid flow meter and a damping device shoe embodiment.

Referring to FIGS. 1B and 2, an ultrasonic flow meter system 30 is provided operable to be attached to the exterior of a pipe 26 containing a fluid flow 24, which system is sometimes referred to as a "clamp-on" type system. The system includes an ultrasonic flow meter 32 and a damping device 34. The pipe 26 has a pipe wall 36 with wall thickness 38, an exterior surface 40, and an axial centerline 42.

Figure 3:
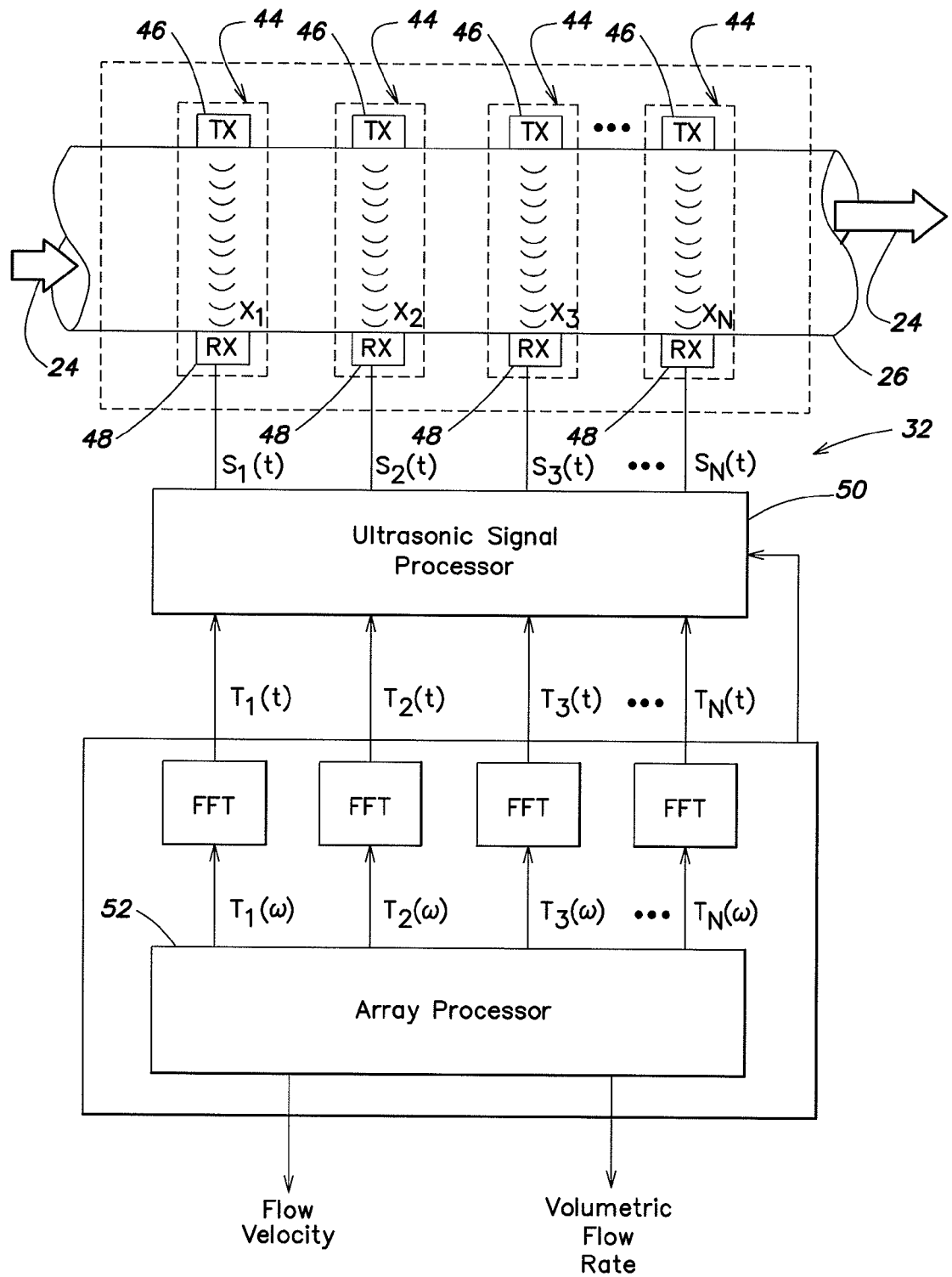
FIG. 3 is a schematic representation of a clamp-on fluid flow meter that can be used with the present fluid flow metering system.

The present invention damping device 34 embodiments can be used with a variety of ultrasonic flow meters 32. The ultrasonic flow meter described in U.S. Pat. No. 7,389,187, which is hereby incorporated by reference in its entirety, is an example of such a device. As can be diagrammatically seen in FIG. 3, the flow meter 32 includes an array of ultrasonic sensors 44 disposed axially along the length of a pipe. Each ultrasonic sensor 44 comprises a transmitter 46 (TX) and a receiver 48 (RX) pair. The transmitter 46 provides an ultrasonic signal across the pipe 26 in a direction that is orthogonal to the direction of the fluid flow 24 where it is received by the corresponding receiver 48. The present invention is not limited to use with sensors 44 having orthogonally opposed transmitter-receiver pairs, however, and can be used with alternative sensor configurations such as pitch and catch configurations, pulse echo configurations, and combined transmitter/receiver ultrasonic sensors, all of which can be used with a clamp on ultrasonic flow meter. The present invention damping device can be used with any of these sensor configurations and is not limited to use with these configurations. The damping device 34 embodiments are described below relative to an array of orthogonally arranged transmitters 46 and receivers 48 to facilitate the description of the damping device embodiments.

The signals $S_1(t)$-$S_N(t)$ received from each ultrasonic sensor 44 are processed by an ultrasonic signal processor 50 and a signal processor 52 (having an array processor) for determining the parameters including the velocity of the fluid flow and/or volumetric flow rate. The signal processor 52 includes array processing logic, examples of which include SONAR processing logic and cross-correlation processing logic.

One embodiment of the damping device 34 is in the form of a shoe 54 disposable between one of the sensor transmitter 46 and the pipe wall 36, the sensor receiver 48 and the pipe wall 36, or both. FIG. 2 illustrates a shoe 54 disposed between the receiver 48 and the pipe wall 36. The shoe 54 includes a panel 56 and a plurality of tines 58, and has a width 60 and a length 62 (see FIG. 4). The panel 56 has a sensor-side surface 64 and a tine-side surface 66. The tines 58 extend out from the tine-side surface 66 of the panel 56 and terminate in a distal end 68. The length 62 of the shoe 54 extends a distance equal to or greater than the length of the array of ultrasonic sensors of the ultrasonic flow meter 32. Alternatively, two or more shoes 54 can be combined to create a length that is equal to or greater than the length of the array.

The distal ends 68 of the tines 58 are individually and/or collectively shaped to mate with the curvature of the exterior surface 40 of the pipe 26. The curvature can be accomplished by giving the distal ends 68 of the tines 58 a curvature that exists in a normal state (e.g., without the application of external force), or by making the shoe sufficiently flexible so that the shoe can be conformed to the curvature of the pipe 26, or some combination of normal curvature and flexibility. In both instances, the distal ends 68 of the tines 58 conform with the pipe 26 to create a uniform and intimate contact between the distal ends 68 and the exterior surface 40 of the pipe 26, thereby facilitating wave energy transfer from the pipe wall 36 to the shoe 54. The shoe platform 56 is sufficiently flexible so that in response to wave energy transmitted to the platform 56 through the tines 58 as a result of a ring-around signal 22, that portion of the platform 56 and the aligned tine 58 can radially displace relative to adjacent portions of the platform 56, and thereby dissipate the wave energy.

Figure 4:
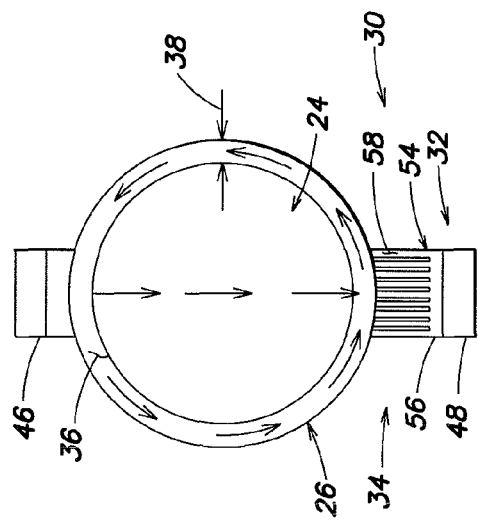
FIG. 4 is a diagrammatic isometric view of a present invention damping device embodiment.
Figure 5:
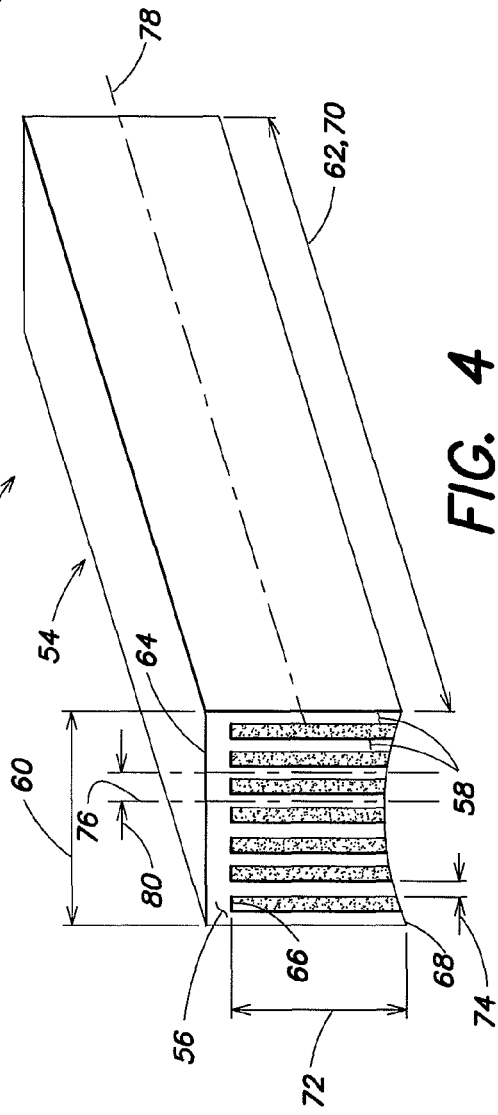
FIG. 5 is a partial view of the damping device embodiment shown in FIG. 4 subject to a circumferentially traveling ring-around signal wave.

FIG. 4 illustrates a diagrammatic view of a shoe 54, and FIG. 5 shows a diagrammatic enlarged sectional view of a shoe 54, illustrating a plurality of tines 58. Each tine 58 extends out from the panel 56 and has a length 70, a height 72, and a width 74. Each tine 58 is preferably similar to, or the same as, the other tines 58, albeit some may vary in height. Each tine 58 has a heightwise extending centerline 76 and a lengthwise extending centerline 78. When the shoe 54 is attached to a pipe 26, the heightwise extending centerline 76 extends substantially radially and the lengthwise extending centerline 78 extends axially. The tines 58 extend lengthwise along the shoe 54 substantially parallel with one another and are spaced apart from one another by a predetermined tine-to-tine distance 80 that extends between the centerlines 76 of adjacent tines 58. The tines 58 have a stiffness that facilitates the dissipation of energy transferred from wave energy introduced into the tine 58 as will be described below. The tines 58 are tuned to dissipate energy and to avoid resonant behavior that would amplify wave energy at the frequencies expected in the application at hand.

The tine-to-tine separation distance 80 for the shoe 54 is specifically chosen so that it provides effective damping for a range of structural borne frequencies of interest (i.e., the ring-around signals, and in particular the more predominant ring-around signals), preferably including the shortest anticipated wavelength of the structural borne frequencies 22. The frequency of the shear mode ring-around signals 22, and therefore their wavelengths, is a function of the transmitter 46 excitation frequency. A more detailed description of the ring-around signals 22 and their relationship to the transmitter 46 excitation frequency is provided below. In preferred applications, the tine-to-tine separation distance 80 is equal to or less than one-half the wavelength of the shear mode ring-around signal wave 22 (see FIG. 5). For those applications where the tine-to-tine separation 80 is less than one half the ring-around wavelength, wavelengths that are factors of two less (e.g., one-quarter wavelength, one-eighth wavelength, etc.) are preferred for alignment purposes as will be described below.

The shoe 54 is made of a material that is operable to receive wave energy from the pipe 26. In preferred embodiments, the impedance of the shoe material is approximately the same as that of the pipe wall 36 so as to minimize wave energy reflectance that may occur as a result of an impedance mismatch between the two materials. It is not necessary, however, to match shoe material impedance to that of the pipe wall 36 material.

In some embodiments, a viscoelastic material 82 is disposed between and bonded to, the tines 58 of the shoe 54. An example of an acceptable viscoelastic material 82 is Loctite® Hysol® 9460™ epoxy adhesive commercially offered by the Henkel Corporation. The present invention is not limited to any particular viscoelastic material 82 and a variety of different materials may be used, with preferred materials varying depending upon the particular environment of the application.

In an alternate embodiment of the shoe 54, the shoe 54 is a laminate structure consisting of alternating layers of tine and viscoelastic material 82, without a panel connecting the tines 58 to one another. The tines 58 are the same as those described above in the shoe 54 embodiment having a panel. Like the above-described embodiment, the tines 58 extend substantially the length of the shoe 54, substantially parallel to one another. The viscoelastic material 82 is also the same as that described above, and is bonded to the surfaces of the tines 58.

The shoe 54 is attached to the exterior surface 40 of the pipe wall 36. The present invention is not limited to any particular means (e.g., mechanical: straps, clamps, fasteners, etc.; chemical: epoxy, tapes, glues, etc.) for attaching the shoe 54 to the exterior surface 40 of the pipe 26, and may include a couplant disposed between the shoe 54 and the pipe 26. In preferred embodiments, the distal ends of the tines 58 are conformed and adhered to the exterior surface 40 of the pipe 26 with a thin and uniform layer of an epoxy adhesive. Loctite® Hysol® 9460™ brand epoxy adhesive commercially offered by the Henkel Corporation can be used to bond the damping device 34.

Figure 6:
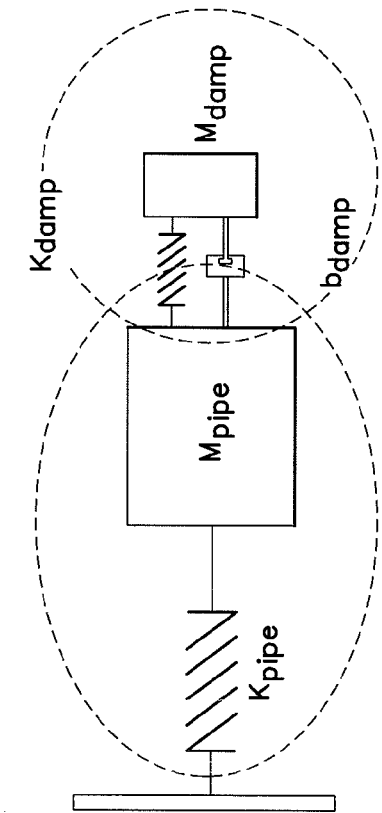
FIG. 6 is a schematic model of the coupled system of the pipe and an embodiment of the present invention damping device.

Now referring to FIGS. 6-13, in other embodiments the damping device 34 has a body that can be attached to the exterior surface 40 of the pipe wall 36 at any position around the periphery of the pipe 26 between the sensor transmitters 46 and receivers 48, and which is "tuned" relative to ring-around signals 22 associated with a particular application. The term "tuned" is used herein to describe the fact that the damping device 34 has resonant structural modes, each of which modes is associated with a natural frequency, which natural frequencies are closely matched (i.e., the same as or substantially similar) to one or more of the ring-around signal 22 frequencies. Deflections associated with the resonant structural modes cause the damping device 34 to dissipate energy and thereby damp the ring-around signals 22. The resonant structural modes, and deflections associated therewith may be described relative to an imaginary centerline 93 relative to which the device 34 will oscillate upon excitation. The damping device 34 can be tuned, for example, by schematically modeling the coupled system of the pipe 26 and the damping device 34, as is shown in FIG. 6, where $M_{pipe}$=mass of the pipe 26, $M_{damp}$=mass of the damping device 34, $K_{pipe}$=spring force constant of the pipe 26, $K_{damp}$=spring force constant of the damping device 34, and $b_{damp}$=the proportionality constant relating the damping force $F_d$ to the velocity (or in this case, the time rate of change of distance between the two attachment points of the damper; $F_d=b_{damp}*v$).

The tuned damping devices 34 are made of a material that is operable to receive wave energy from the pipe 26, as is the same as or similar to the show material described above.

Figure 7:
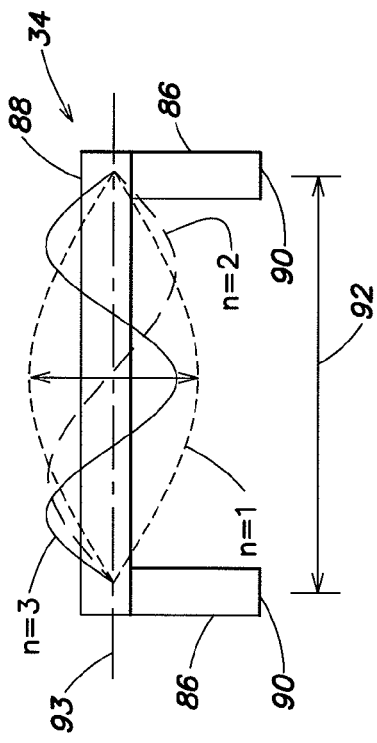
FIG. 7 is a diagrammatic view of an embodiment of a present invention damping device.

In one tuned embodiment, each damping device 34 includes at least two legs 86 connected to one another by a panel 88. Each of the legs 86 has a distal end 90 that is shaped to permit contact with the outer surface 40 of the pipe wall 36. The "C" shaped damping device 34 shown in FIG. 7 is an example configuration of this embodiment of damping device 34, but the damping device 34 is not limited to this configuration. The legs 86 of the damping device 34 are similar to, or the same as, the tines 58 described above within the shoe 54 embodiment of the damping device 34.

In preferred embodiments, the leg-to-leg separation distance 92 is chosen to correspond with an integral number (e.g., n=1, 2, 3, etc.) of wavelengths of a ring-around signal 22. As indicated above, the term "ring-around wavelength" is used to describe a distance that is representative (e.g., average) of the wavelengths of one or more shear mode ring-around signals 22 circumferentially traveling within the wall of the pipe 26. FIG. 7 diagrammatically illustrates a damping device 34 having a leg-to-leg separation distance 92 that is substantially equal to an integral number of the ring-around wavelengths. FIG. 7 illustrates three different damping device panel 88 resonant structural modes (i.e., n=1, 2, 3), which modes have associated natural frequencies (and associated wavelengths) that correspond to integral numbers of ring-around wavelengths. The resonant structural modes are shown having mode shapes which are symmetric about the imaginary centerline 93. In alternative embodiments, the damping device 34 has a configuration with asymmetric resonant structural modes having shapes that correspond to a leg-to-leg separation distance 94 substantially equal to (2n+

Figure 8:
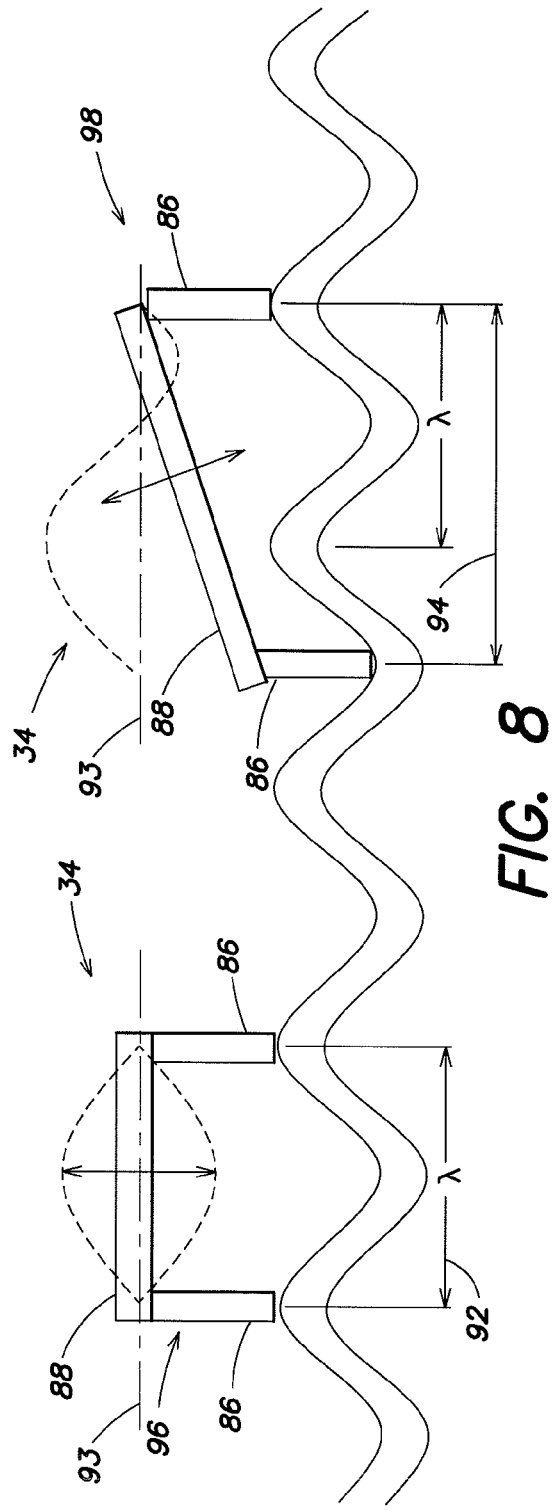
FIG. 8 is a diagrammatic view of the damping device shown in FIG. 7, subject to a circumferentially traveling ring-around signal wave.
Figure 12:
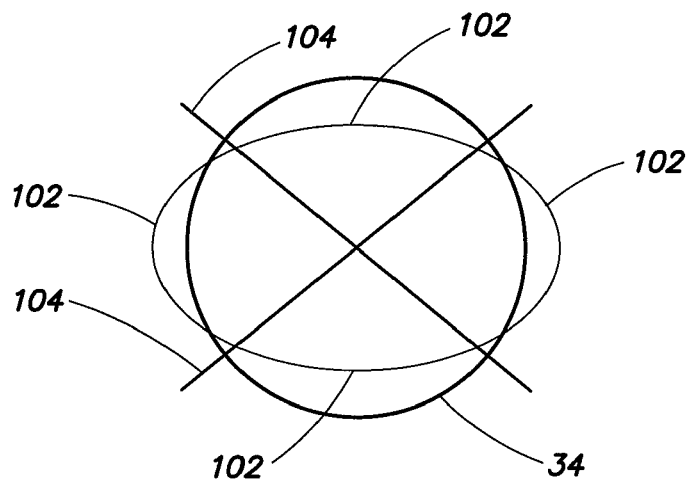
FIGS. 12 and 13 are diagrammatic views of cylindrical damping devices subject to different structural modes of vibration.
Figure 13:
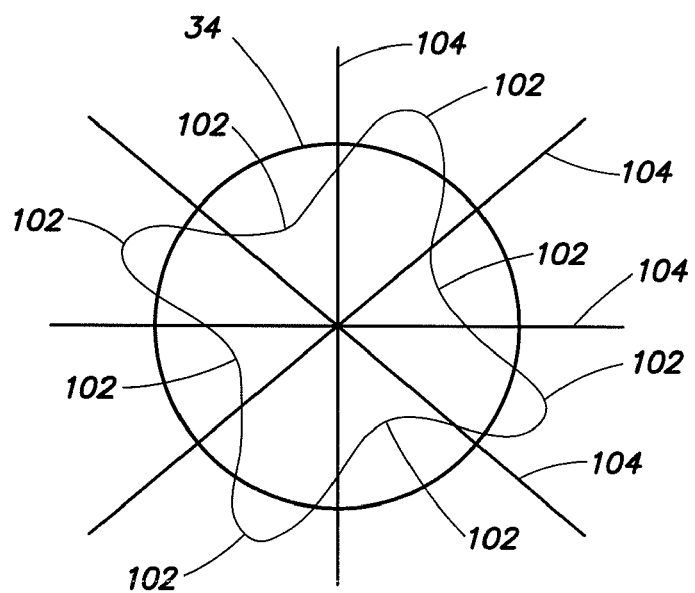

1)/2 of the ring-around wavelengths; i.e., an odd integral number of half wavelengths. FIG. 8 diagrammatically illustrates a first damping device 96 like that shown in FIG. 7, and a second damping device 98 with a leg-to-leg separation distance 94 substantially equal to (2n+1)/2 of the ring-around wavelengths.

In some embodiments, the damping device 34 shown in FIG. 9 may further include a layer of viscoelastic material 82 attached to one or more surfaces of the panel 88 extending between the legs 86. Examples of acceptable viscoelastic material 82 are provided above. In still further embodiments, a structural member 100 (e.g., a plate) may be attached to the viscoelastic material 82, thereby disposing the viscoelastic material 82 between the damping device panel 88 and the structural member 100. In this configuration, the viscoelastic material 82 is operable to act as a constrained layer and thereby damp motion of the panel 88.

Now referring to FIGS. 10-13, in another tuned embodiment the damping device 34 has a body that contacts the outer surface 40 of the pipe wall 36 at a single point. The single point contact obviates the need to position two or more contact points relative to the wavelengths of the ring-around shear waves. FIG. 10 illustrates a plurality of the single point contact damping structures 34 disposed around the periphery of the pipe 26, between the sensor array transmitters 46 and receivers 48. The damping structures 34 are shown as cylindrical shaped structures, which is a preferred embodiment. The single point damping structures 34 are not, however, limited to a cylindrical geometry and may assume other geometries (e.g., elliptical, rectangular, diamond, etc.)

As indicated above, the single point damping structures 34 are "tuned" by having one or more resonant structural modes, each having an associated natural frequency, which natural frequencies are closely matched to (exactly or substantially the same as) to ring-around frequencies 22. As a result, subject to the excitation of the ring-around frequencies 22, the single point damping devices 34 deflect and dissipate energy. A cylindrical shaped damping device 34, for example, can have a structural mode which when properly excited can result in a mode of deflection typically referred to as "egging" (e.g., see FIGS. 11 and 12), wherein the cylinder 34 has four regions of deflection 102 relative to a pair of nodal diameters 104. The cylindrical damping device 34 can also be subject to higher structural modes, such as that shown in FIG. 13 which diagrammatically illustrates eight regions of deflection 102 relative to four nodal diameters 104.

The damping devices 34 can be "tuned" relative to the ring-around frequencies 22 by first determining the ring-around frequencies 22 for the application at hand based on the sensor transmitted frequencies, as is described below. The damping device 34 configuration (e.g., characteristics of a cylindrical tube) is subsequently chosen based on a match between the ring-around frequencies and the natural frequencies associated with the resonant structural modes of the damping device 34. The natural frequencies of a cylindrical damping device 34, for example can be determined using known mathematical expressions, such as:

$$f_n = \frac{1}{2\pi} \frac{n(n^2-1)}{\sqrt{n^2+1}} \sqrt{\frac{E}{\rho(1-v^2)}} \sqrt{\frac{1}{12}} \frac{t}{R^2}$$

where $f_n$=a resonant natural frequency, n=mode number, E=modulus of elasticity of the damping device 34, t=damping device wall thickness, $\rho$=density of the damping device material, $v$=Poisson's ratio, and R=the radius of the damping device 34. The above frequency equation is an example of a means for determining resonant natural frequencies of a damping device 34, and the present invention is not limited thereto. Single point damping devices 34 having resonant structural modes in the 100-1000 kHz range are well suited to oil and gas piping applications.

In some embodiments, the single point damping devices 34 may include a layer of viscoelastic material 82 (as described herein) on one of the outer surface or inner surface of the device 34, or on both. In still further embodiments, a structural member (e.g., a plate) may be attached to the viscoelastic material 82, thereby disposing the viscoelastic material 82 between the pipe wall 36 and the structural member. In this configuration, the viscoelastic material 82 is operable to act as a constrained layer and thereby damp motion of the panel pipe wall 36.

Figure 14:
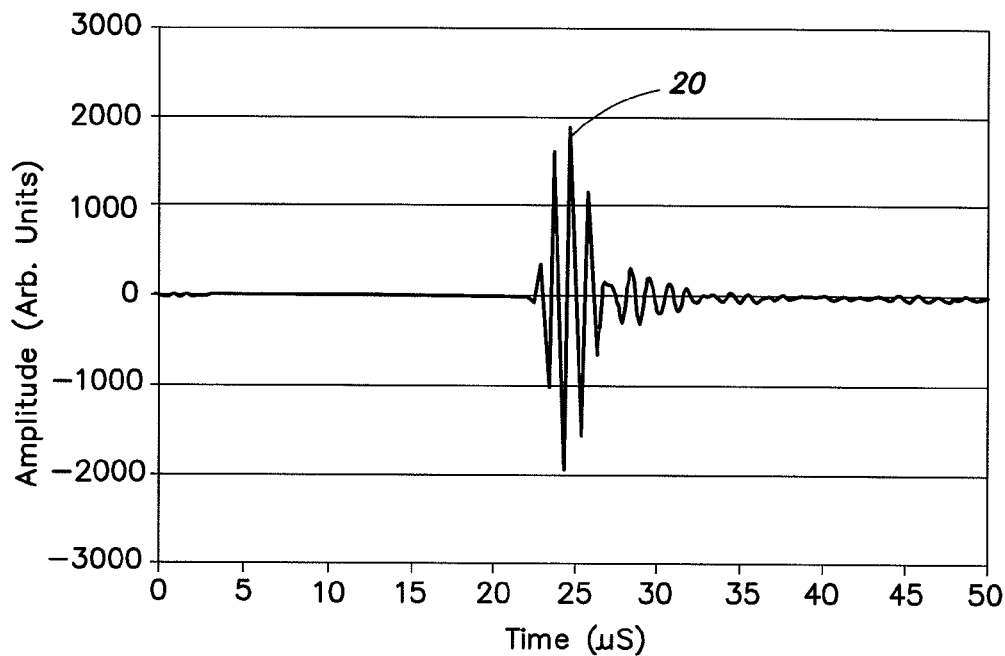
FIG. 14 is a graph depicting a fluid borne component of a transmitted ultrasonic signal.
Figure 15:
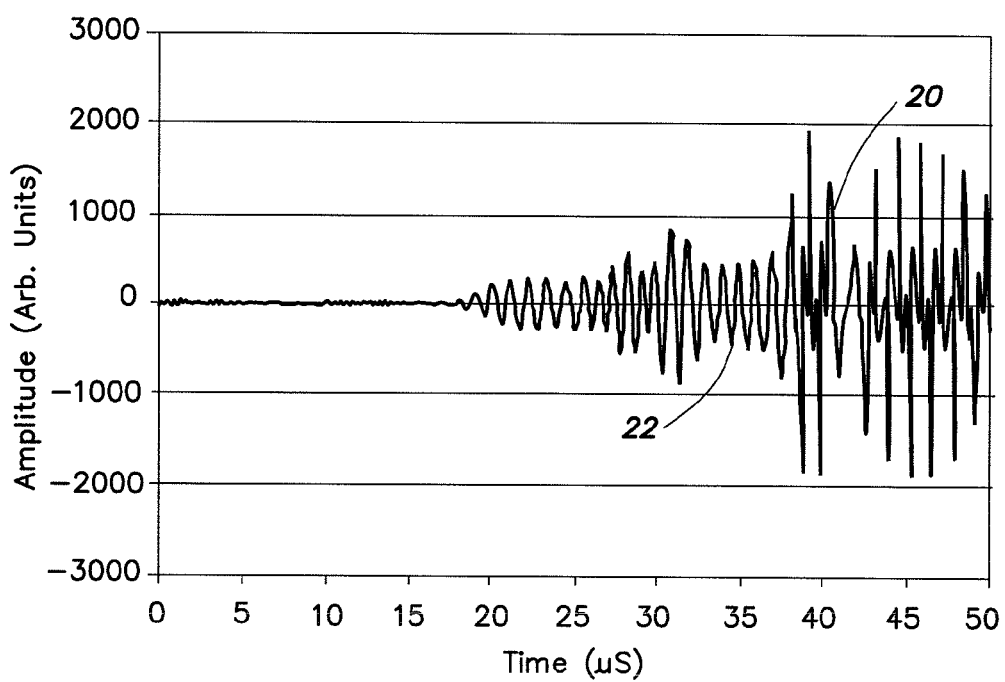
FIG. 15 is a graph depicting a fluid borne component and a structural borne component of a transmitted ultrasonic signal.

In the operation of an ultrasonic flow meter utilizing a present invention damping device 34, each transmitter 46 in the sensor array is periodically pulsed to create the ultrasonic signal that transmits through the pipe 26 and fluid flow 24. Each transmitter 46 has a fundamental oscillation frequency, which when pulsed will emit a short ultrasonic burst signal at that frequency. FIG. 14 shows a signal created when an ultrasonic transmitter 46 having a fundamental oscillation frequency of 1 MHz is pulsed with a ten nanosecond (10 ns) width pulse. The receiver 48 associated with the transmitter 46 will receive the fluid borne component 20 of the signal once it has bisected the pipe 26. In addition to the fluid borne component 20, however, non-fluid borne component signals 22 will also be received; i.e., "ring-around" signals 22. FIG. 15 shows a diagram of a transmitted ultrasonic signal having a fluid borne component 20 and a structural borne component 22. The fluid borne component 20 travels between the orthogonally arranged transmitter 46 and receiver 48 pair of the ultrasonic sensor 44, in a direction that is normal to the direction of the fluid flow 24 within the pipe 26. At the same time, ring-around signals 22 are created that travel circumferentially within the pipe wall 36. In the absence of damping, the ring-around signal 22 will circumferentially travel to the receiver 48 in less time than the fluid borne component 20 with little attenuation, relatively speaking. In many instances, the ring-around signal 22 will travel from the transmitter 46 in both circumferential directions (i.e., clockwise and counterclockwise) and will circle the pipe 26 several times before fading out. Consequently, the ring-around signals 22 provide a considerable amount of the signal content received by the receivers 48, and make it very difficult to distinguish the desirable fluid borne component 20 signals from undesirable non-fluid borne signals 22. The problems associated with distinguishing the two signal components 20, 22 can be appreciated by comparing the signal shown in FIG. 15 (includes a ring-around component 22 and a fluid borne component 20) to the ultrasonic signal shown in FIG. 14 (only transmitted signal 20, no ring-around signal 22).

In the case of the damping device 34 embodiment shown in FIGS. 2, 4, and 5 (i.e., a damping device 34 in the form of a shoe 54), one of the mechanisms by which the shoe 54 dissipates energy is radial displacement of tines 58 that is caused by the ultrasonic shear wave 22. The ultrasonic shear waves 22 (e.g., the ring-around signal) travel in a circumferential direction which is normal (i.e., perpendicular) to the height of the parallel tines 58. The specific damping mechanism acting on the circumferentially traveling waves as they pass through the pipe wall 36 section aligned with the shoe 54 is described in detail below. The fluid borne signals traveling between the transmitter 46 and receiver 48, in contrast, travel in a direction that is parallel to the tines 58 of the shoe 54. As a result, the fluid borne signal 20 is able to transmit within the tines 58 with no appreciable interference.

FIG. 5 shows an exaggerated diagram of tine 58 displacement to illustrate the damping mechanism which actually occurs on a microscale. In the shoe 54 embodiment having a panel 56, the tine 58 displacement is resisted by the panel 56, and by the viscoelastic material 82 when included. The relative tine 58 motion, and resistance thereto, damps the ring-around signals 22. The shoe 54 embodiment formed as a laminate (i.e., layers of tine and viscoelastic material 82) operates in similar fashion, except that the tine motion is resisted by the viscoelastic material 82 alone.

The ability of the shoe 54 to damp the ring-around signals is greatly enhanced by correlating the tine-to-tine separation distance 80 to the wavelength of the shear wave 22 propagating through the pipe wall 36; i.e., the tine-to-tine distance 80 within a shoe 54 is chosen to coincide exactly or approximately with an aspect of the shear wave wavelength propagating within the pipe wall 36. The diagram shown in FIG. 5 illustrates a tine-to-tine separation distance equal to one-half the wavelength of the shear wave. In this instance, the tines 58 are subject to the maximum and minimum amplitude of the wave, which is a condition that maximizes damping by the shoe 54. Tine-to-tine separation distances less than one wavelength of the shear wave 22 represent a correlation that provides enhanced damping, including optimum damping associated with one-half wavelength tine-to-tine separation 80, and wavelengths that are factors of the one-half wavelength (e.g., one-quarter wavelength, one-eighth wavelength, etc.).

To illustrate the relationship between the wavelength of a circumferentially traveling ring-around wave 22 and the tine-to-tine separation distance 80, consider an example wherein a flow meter 32 has one or more ultrasonic transmitters 46, each with an oscillating frequency of 1 MHz. The transmitters 46 will produce compression waves traveling at 1 MHz through the pipe wall 36 in a direction normal to the pipe wall 36. The compression waves, in turn, will produce circumferentially traveling shear waves 22 within the pipe wall 36 traveling at a frequency of approximately 500 kHz, since shear waves travel at a speed approximately one-half that of the associated compression waves due to the difference between the bulk modulus and the shear modulus of the material. The sound velocity of waves within a material may be mathematically described as follows:

$$c_c = \sqrt{\frac{K}{\rho}} \text{ and } c_s = \sqrt{\frac{G}{\rho}}$$

where $c_c$ is the compression wave sound velocity, $c_s$ is the shear wave sound velocity, K is bulk modulus, G is the shear modulus, and $\rho$ is the density of the material.

In preferred embodiments, the wavelength associated with the transmitter oscillating frequency is approximately twice the thickness 38 of the pipe 26 containing the fluid flow 24. In such embodiments, the wavelength of the shear wave is, therefore, approximately equal to the thickness of the pipe 26. If the pipe wall 36 is made of steel, the speed of sound of a shear wave in steel is approximately 2500 m/s. The associated wavelength of the shear wave within the steel pipe 26 is approximately 5 mm. A damping plate having a tine-to-tine separation of 2.5 mm will have a tine aligned with the minimum and maximum amplitude positions of the shear wave traveling through the pipe wall 36, similar to that shown in FIG. 5. As a result, the energy transfer to the shoe 54, and the ability of the shoe 54 to function as a constrained layer dissipation mechanism, is greatly enhanced.

As stated above, the tine-to-tine spacing 80 is not limited to one-half the wavelength of the shear wave traveling within the pipe wall 36. Other tine-to-tine spacing based on a distance that is less than one wavelength of the shear wave will facilitate the ability of the damping device 34 to damp the undesired ring-around signals that are created when using a clamp-on ultrasonic flow meter 32.

In the operation of an ultrasonic flow meter system utilizing a present invention tuned damping device 34, each transmitter 46 in the sensor array of the flow meter 32 is periodically pulsed to create the ultrasonic signal as is described above. In the tuned embodiments, the wavelength of the ring-around signals 22 traveling circumferentially within the pipe wall 36 provides an excitation force acting on the tuned damping device 34 attached to the outer surface of the pipe wall 36. In the case of the tuned device shown in FIG. 7, the leg-to-leg separation distance 92, which corresponds to an integral number of ring-around wavelengths, causes flexure modes associated with the particular resonant structural modes and consequent damping. The leg-to-leg separation distance 94 associated with (2n+1)/2 of the ring-around wavelengths, as is shown in FIG. 8, provides similar damping. FIG. 11 illustrates the cylindrical embodiment of the single point contact tuned damping device 34, specifically illustrating in phantom line "egg-shaped" deflection of the cylindrical embodiment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein as the best mode contemplated for carrying out this invention.

What is claimed is:

1. A damping device for a fluid flow meter mountable on the exterior of a pipe to meter fluid flow traveling within the pipe, which flow meter has at least one ultrasonic sensor operable to transmit ultrasonic signals through a pipe wall in a direction substantially normal to the pipe wall and into a fluid flow disposed within the pipe, which signals create secondary ultrasonic signals circumferentially traveling within the pipe wall at one or more frequencies, the device comprising:

one or more tuned bodies, each attachable to the pipe wall at one or more contact points, each of which body has one or more resonant structural modes, each mode with an associated natural frequency, which natural frequencies are closely matched to the one or more frequencies of the secondary signals, and which body is operable to dissipate energy upon excitation by the secondary signals.

2. The device of claim 1, wherein the tuned body has a geometry such that the body contacts the pipe wall at a single point.

3. The device of claim 2, wherein the tuned body is cylindrically shaped.

4. The device of claim 3, wherein the cylindrically shaped tuned body has resonant structural modes with associated natural frequencies in the range of 100 kHz to 1000 kHz.

5. The device of claim 4, wherein the tuned body includes a layer of viscoelastic material attached to a surface.

6. The device of claim 5, wherein the viscoelastic material is disposed between the pipe wall and a member.

7. The device of claim 1, wherein the tuned body has a geometry such that the body contacts the pipe wall at two or more points.

8. The device of claim 7, wherein the tuned body has a panel extending between a pair of legs, wherein each leg has a distal end shaped to mate with the pipe.

9. The device of claim 8, wherein the resonant structural modes and associated natural frequencies of the tuned bodies are symmetric about a centerline, and wherein each tuned body has a leg-to-leg separation distance that substantially corresponds to an integral number of wavelengths of the secondary ultrasonic signals traveling with the pipe.

10. The device of claim 8, wherein the resonant structural modes and associated natural frequencies of the tuned bodies are asymmetric about a centerline, and wherein each tuned body has a leg-to-leg separation distance that substantially corresponds to an odd integral number of half wavelengths of the secondary ultrasonic signals traveling with the pipe.

11. The device of claim 10, wherein a layer of viscoelastic material is attached to a surface of the tuned body panel.

12. A fluid flow meter apparatus operable to be attached to a pipe and to meter fluid flow traveling within the pipe, the apparatus comprising:
a metering device having a plurality of ultrasonic sensors, each having a transmitter and a receiver, which sensors are operable to be mounted on an exterior surface of a wall of the pipe and to transmit ultrasonic signals orthogonally through the wall and into the fluid flow traveling within the pipe, which signals create secondary ultrasonic signals circumferentially traveling within the pipe wall at a frequency; and
a plurality of damping devices attachable to the pipe wall, wherein each device has one or more contact points for contacting the pipe wall, and each device has one or more resonant deflection modes, each with an associated natural frequency, which natural frequencies are closely matched to the one or more frequencies of the secondary signals, and each device is operable to dissipate energy upon excitation by the secondary signals.

13. The apparatus of claim 12, wherein the damping device is cylindrically shaped.

14. The apparatus of claim 13, wherein the cylindrically shaped damping device has resonant structural modes with associated natural frequencies in the range of about 100 kHz to 1000 kHz.

15. The apparatus of claim 12, wherein the damping device has a panel extending between a pair of legs, wherein each leg has a distal end shaped to mate with the pipe.

16. The apparatus of claim 15, wherein the resonant structural modes and associated natural frequencies of the damping devices are symmetric about a centerline, and wherein each damping device has a leg-to-leg separation distance that substantially corresponds to an integral number of wavelengths of the secondary ultrasonic signals traveling with the pipe.

17. The apparatus of claim 15, wherein the resonant structural modes and associated natural frequencies of the damping devices are asymmetric about a centerline, and wherein each damping device has a leg-to-leg separation distance that substantially corresponds to an odd integral number of half wavelengths of the secondary ultrasonic signals traveling with the pipe.

18. A method of damping signals circumferentially traveling within a pipe wall, the method comprising:
attaching a metering device having a plurality of ultrasonic sensors to the pipe, each having a transmitter and a receiver, which sensors are operable to transmit predetermined ultrasonic signals at one or more primary frequencies, which predetermined signals create secondary ultrasonic signals circumferentially traveling within a wall of the pipe at one or more secondary frequencies;
attaching a plurality of damping devices to the pipe wall, wherein each damping device has a body that has one or more resonant structural modes, each with a natural frequency, which natural frequencies are closely matched to one or more of the secondary frequencies;
transmitting one or more of the primary frequencies through the pipe wall in a direction that is substantially normal to the pipe wall; and
damping secondary signals using the damping devices attached to the wall.

19. A damping device for a fluid flow meter mountable on the exterior of a pipe to meter fluid flow traveling within the pipe, which flow meter has at least one ultrasonic sensor operable to transmit ultrasonic signals through a pipe wall in a direction normal to the pipe wall and into a fluid flow disposed within the pipe, which signals create secondary ultrasonic signals circumferentially traveling within the pipe wall at a frequency, the device comprising:
a platform conformable to an exterior surface of the pipe wall, having a sensor-side surface and a tine-side surface; and
a plurality of tines attached to the platform and extending outwardly from the tine-side surface and extending lengthwise along a length of the platform, wherein each tine has a distal end and the distal ends are shaped to mate with the exterior of the pipe, and wherein each tine is spaced apart from an adjacent tine by a tine-to-tine distance.

20. The damping device of claim 19, wherein the tine-to-tine distance is less than the wavelength of the secondary ultrasonic signals circumferentially propagating within the pipe wall.

21. A fluid flow meter apparatus operable to be attached to a pipe and to meter fluid flow traveling within the pipe, the apparatus comprising:
a metering device having a plurality of ultrasonic sensors, each having a transmitter and a receiver, which sensors are operable to be mounted on an exterior surface of a wall of the pipe and to transmit ultrasonic signals orthogonally through the wall and into the fluid flow traveling within the pipe, which signals create secondary ultrasonic signals circumferentially traveling within the pipe wall at a frequency; and
at least one shoe disposed between at least one of the receivers and the pipe wall or the transmitters and the pipe wall, which shoe includes a plurality of tines extending substantially parallel to one another, and each tine spaced apart from an adjacent tine by a tine-to-tine distance, and each tine having a distal end.

22. The apparatus of claim 21, wherein the tine-to-tine distance is less than the wavelength of the secondary ultrasonic signals circumferentially propagating within the pipe wall.

23. The apparatus of claim 21, wherein the tines are attached to and extend out from a platform toward the distal ends, and at least one of the receivers or the transmitters is attached to the platform.

* * * * *